(12) United States Patent
Lydon et al.

(10) Patent No.: US 8,386,677 B2
(45) Date of Patent: Feb. 26, 2013

(54) COMMUNICATING LOCATION INFORMATION BETWEEN A PORTABLE DEVICE AND AN ACCESSORY

(75) Inventors: Gregory T. Lydon, Santa Cruz, CA (US); Ronald Keryuan Huang, Milpitas, CA (US); Lawrence G. Bolton, Fremont, CA (US); Emily Clark Schubert, San Jose, CA (US); Jesse Lee Dorogusker, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1016 days.

(21) Appl. No.: 12/405,839

(22) Filed: Mar. 17, 2009

(65) Prior Publication Data
US 2010/0201567 A1 Aug. 12, 2010

Related U.S. Application Data

(60) Provisional application No. 61/151,763, filed on Feb. 11, 2009.

(51) Int. Cl.
*G06F 13/00* (2006.01)
(52) U.S. Cl. ..................... 710/100; 455/422.1
(58) Field of Classification Search .................. 710/100, 710/300, 105; 455/422.1, 456.2, 456.1, 456.3, 455/457; 342/357.31; 340/539.13
See application file for complete search history.

(56) References Cited

U.S. PATENT DOCUMENTS

| | | | |
|---|---|---|---|
| 5,964,847 A | 10/1999 | Booth et al. | |
| 6,084,517 A | 7/2000 | Rabanne et al. | |
| 6,317,605 B1 | 11/2001 | Sakuma | |
| 6,621,452 B2 | 9/2003 | Knockeart et al. | |
| 6,647,270 B1 | 11/2003 | Himmelstein | |
| 7,143,130 B2 | 11/2006 | Lin | |
| 7,187,947 B1 | 3/2007 | White et al. | |
| 7,293,122 B1 | 11/2007 | Schubert et al. | |
| 7,446,702 B2 | 11/2008 | Huang et al. | |
| 7,529,588 B1 | 5/2009 | Snell | |
| 7,529,870 B1 | 5/2009 | Schubert et al. | |
| 7,529,871 B1 | 5/2009 | Schubert et al. | |
| 7,529,872 B1 | 5/2009 | Schubert et al. | |
| 7,831,216 B1 * | 11/2010 | Yenney et al. | 455/88 |
| 8,000,702 B2 * | 8/2011 | Dawson et al. | 455/433 |
| 2003/0073432 A1 | 4/2003 | Meade et al. | |
| 2004/0155814 A1 | 8/2004 | Bascobert | |
| 2007/0141976 A1 | 6/2007 | Shimakawa et al. | |
| 2008/0030323 A1 | 2/2008 | Katzer | |

* cited by examiner

*Primary Examiner* — Clifford Knoll
(74) *Attorney, Agent, or Firm* — Kilpatrick Townsend & Stockton LLP

(57) ABSTRACT

Location data is exchanged between a portable media device and an accessory. If the portable media player is equipped with location determining capability, the portable media device can communicate its location data to the accessory, and the accessory can use this location data to perform various tasks. If the accessory is equipped with location assistance capability, the accessory can communicate location data to the portable media device, and the portable media device can use this location data to perform various tasks.

28 Claims, 9 Drawing Sheets

COMMUNICATING LOCATION INFORMATION BETWEEN A PORTABLE DEVICE AND AN ACCESSORY

CROSS-REFERENCES TO RELATED APPLICATIONS

This application claims priority from U.S. Provisional Patent Application No. 61/151,763, filed on Feb. 11, 2009 entitled "COMMUNICATING LOCATION INFORMATION BETWEEN A PORTABLE DEVICE AND AN ACCESSORY", the disclosure of which is incorporated by reference herein in its entirety.

TECHNICAL FIELD

This disclosure relates generally to portable media devices such as media players and accessories and in particular to communicating location information between a portable media device and an accessory.

BACKGROUND

A portable media device can store media assets, such as audio tracks, video tracks or photos that can be played or displayed on the portable media device. Examples of portable media devices are the iPod® and the iPhone™ portable media devices, which are available from Apple Inc. of Cupertino, Calif. In addition to storing and playing media assets, the portable media device can have the capability to determine where the device is located. For instance, the device can be equipped with Global Positioning System (GPS) capability, cellular phone tower triangulation capability, or the like.

A portable media device can include one or more connectors or ports that can be used to interface with other devices. For example, the connector or port can enable the portable media device to couple to a host computer, be inserted into a docking system, or receive an accessory device. In the case of the iPod®, e.g., a vast array of accessory devices have been developed that can interconnect to the portable media device.

A number of portable GPS-enabled devices are currently available. GPS-enabled devices are used in a variety of applications like vehicle navigation, vehicle locating service, surveying, pet and people location determination etc. These devices generally derive location data from a constellation of 27 earth-orbiting satellites using a method called trilateration. The orbits of the satellites are arranged so that at any time, anywhere on Earth, at least four satellites are "visible" in the sky. Each GPS satellite transmits data that indicates its location and the current time. All GPS satellites synchronize operations so that these repeating signals are transmitted at the same instant. The signals, moving at the speed of light, arrive at a GPS-enabled receiving device at slightly different times because some satellites are farther away from the GPS-enabled device than others. A GPS-enabled receiving device detects the signals from least four of the GPS satellites. The receiving device can then determine its distance to each of the detected satellites based on the differences in arrival times of the signals from the satellites. The receiving device can compute its own location based on the distance information determined.

SUMMARY

Embodiments of the present invention relate to exchanging location data between a portable media device and an accessory. In one embodiment, the portable media player is equipped with location determining capability. The portable media device can communicate its location data to the accessory. The accessory can use this location data to perform various tasks, e.g., displaying the location on a map for a user. In another embodiment, the accessory is equipped with location assistance capability and can communicate location data to the portable media device. The portable media device can use this location data to perform various tasks, e.g., locating points of interest nearby to the current location.

The following detailed description, together with the accompanying drawings will provide a better understanding of the nature and advantages of the present invention.

DETAILED DESCRIPTION OF EMBODIMENTS

Embodiments of the present invention relate to exchanging location data between a portable media device and an accessory. In one embodiment, the portable media player is equipped with location determining capability. The portable media device can communicate its location data to the accessory. The accessory can use this location data to perform various tasks, e.g., displaying the location on a map for a user. In another embodiment, the accessory is equipped with location assistance capability and can communicate location data to the portable media device. The portable media device can use this location data to perform various tasks, e.g., locating points of interest near the current location.

Figure 1A:
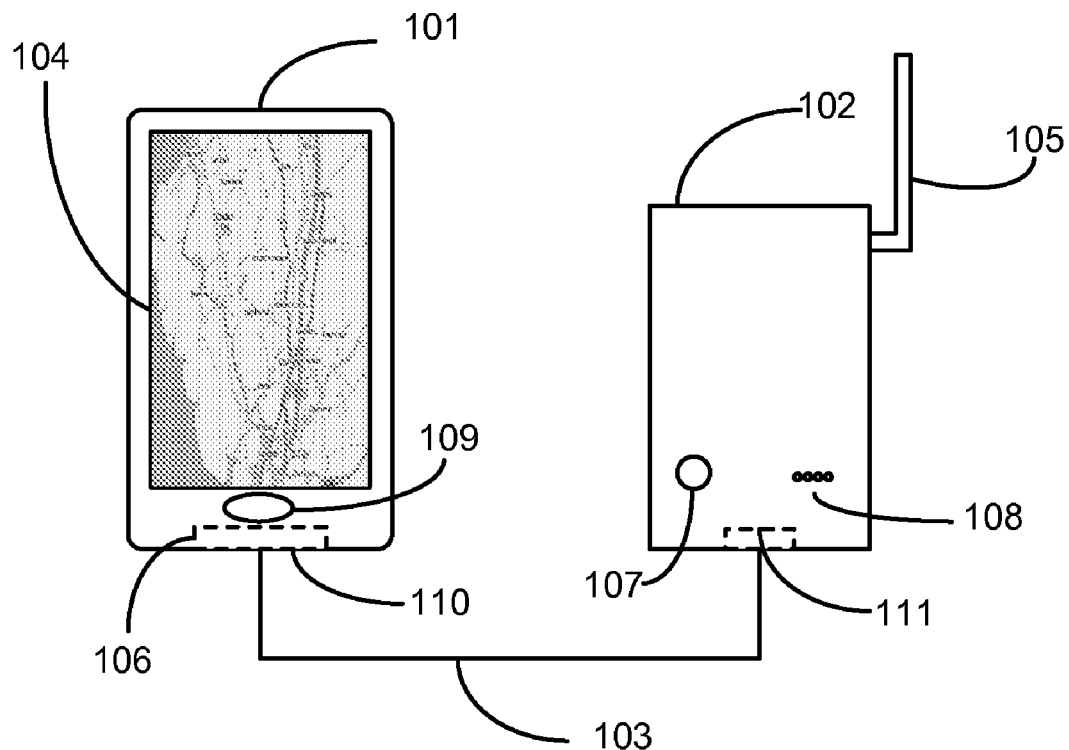
FIG. 1A is a schematic illustrating a portable media device and an accessory equipped with location determination capability to enable exchange of location data according to one embodiment of the present invention.

FIG. 1A shows a portable media device ("PMD") 101 and accessory 102 according to an embodiment of the present invention. PMD 101 has a user interface that can include touch screen display 104 and one or more control buttons 109 (e.g., a "home" button as found on certain iPod™ touch media players manufactured and sold by Apple Inc., assignee of the present application). Display screen 104 can present a GUI image to the user, and the user can interact with the GUI image, e.g., by tactile interaction with screen 104 or by operating control buttons 109. PMD 101 also has a connector 106 disposed on its bottom surface 110. Connector 106 can provide mechanical and electrical coupling to other devices. In this embodiment, PMD 101 is configured to receive location data from accessory 102 and to display, on display 104, information based on the location data, e.g., current location on a map, nearby points of interests, or provide other location based services. An example of how PMD 101 can be configured to receive location data from an accessory is described below.

Accessory device (also referred to as "accessory") 102 includes an antenna 105 and one or more indicator lights 108. Accessory 102 can be equipped with location determination capability, e.g., GPS or the like. Accessory 102 can provide location data to PMD 101. Antenna 105, which can be either an external or internal antenna, can be used to capture location data information from one or more sources, e.g., GPS satellites, wireless access points, or the like. In addition, antenna 105 can also be used to transmit information from the accessory over a wireless medium. An optional power "on/off" switch 107 can be provided to turn accessory 102 on or off. Other controls can also be provided.

Accessory 102 and PMD 101 can be connected to each other via connector 106 of PMD 101 and a corresponding connector 111 on accessory 102 using a wired connection, e.g., cable 103. Alternatively, PMD 101 and accessory 102 can communicate with each other over a wireless medium.

Figure 1B:
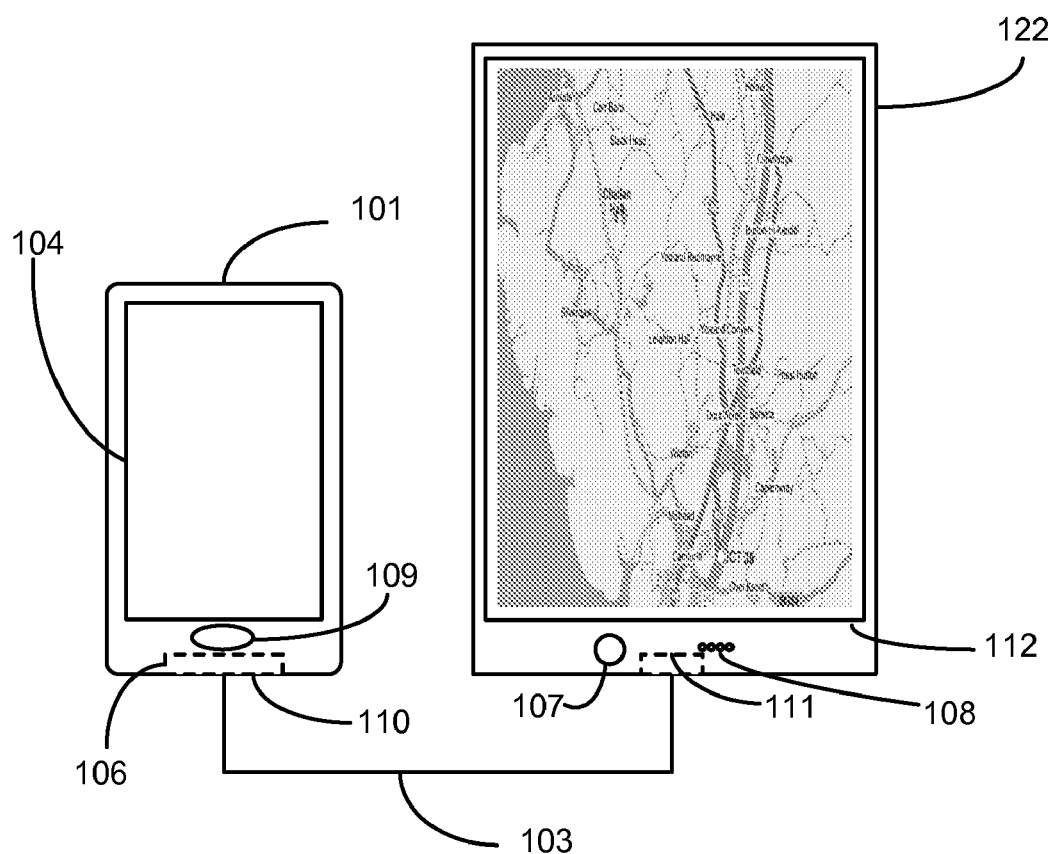
FIG. 1B is a schematic illustrating a portable media device equipped with location determination capability and an accessory to enable exchange of location data according to one embodiment of the present invention.

FIG. 1B illustrates a system according to another embodiment of the present invention. In this embodiment, PMD 101 is equipped with location determination capability, e.g., GPS, and can communicate location data to accessory 122 using cable 103. Alternatively, PMD 101 and accessory 122 can communicate wirelessly.

Accessory 122 is equipped to receive the location data from PMD 101, and its user interface can include a display 112 in addition to indicator lights 108 and power switch 107. Display 112 can be used to display various information, including information based on location data received from PMD 101, e.g., current location on a map, nearby points of interest, etc.

It will be appreciated that the systems of FIGS. 1A and 1B are illustrative and that variations and modifications are possible. For instance, the PMD and/or the accessory can be equipped with capability to determine location using non-GPS sources such as cellular phone towers, wireless access points, or the like in addition to or instead of GPS. A variety of portable media devices and accessories can be used, not limited to the particular examples depicted. Although the embodiments described above present scenarios where either the PMD or the accessory has location determination capability, alternative embodiments can include a PMD and accessory that are both equipped with location determination capability.

Figure 2A:
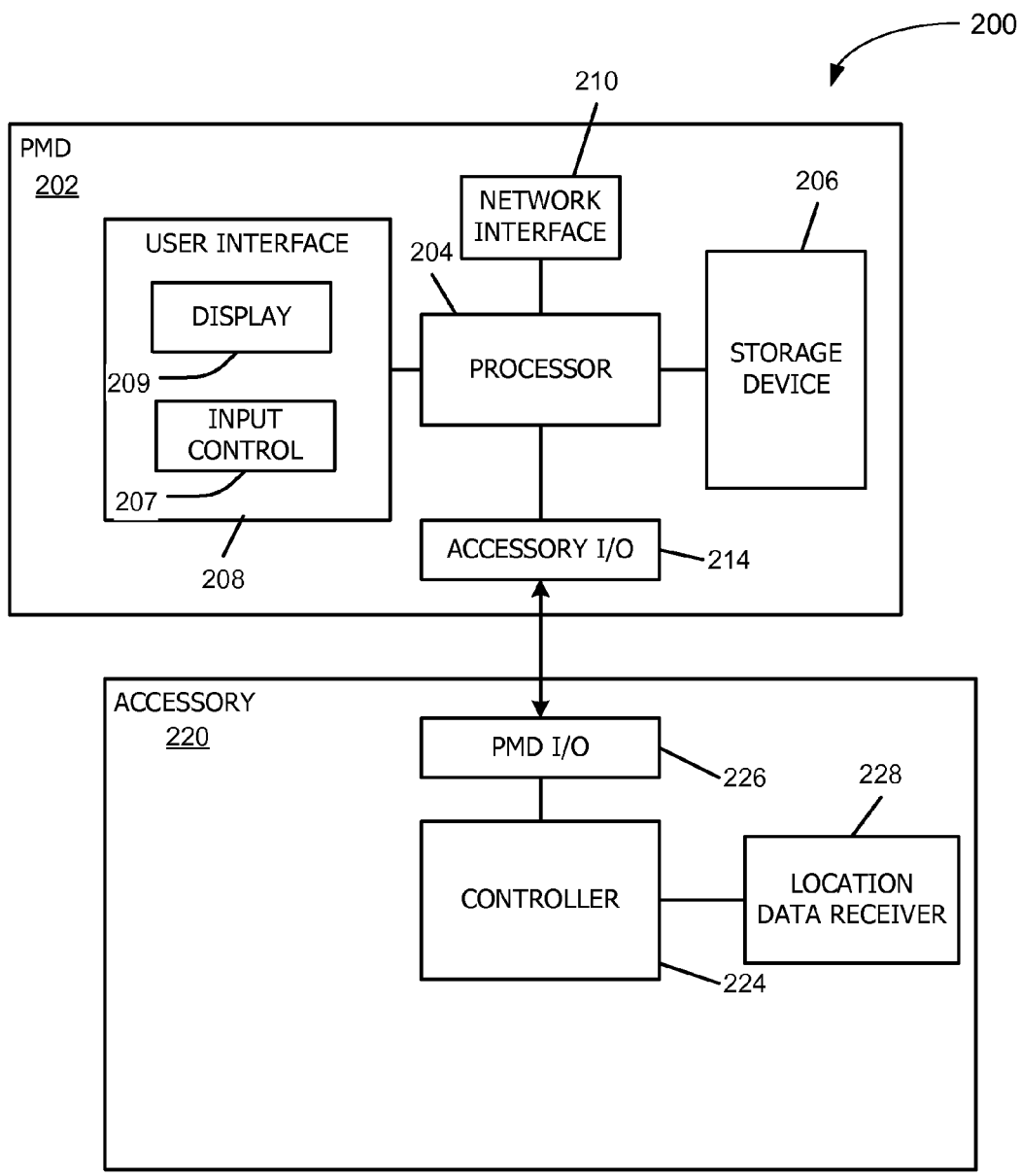
FIG. 2A is a block diagram of a system including a PMD and accessory according to an embodiment of the present invention.

FIG. 2A is a block diagram of system 200 according to an embodiment of the present invention in which the accessory has location determination capability and can send location data to the PMD. System 200 can include PMD 202 (e.g., implementing PMD 101 of FIG. 1A) and accessory 220 (e.g., implementing accessory 102 of FIG. 1A).

PMD 202 in this embodiment can provide location-based services in addition to storage and playback of media assets. PMD 202 can include processor 204, storage device 206, user interface 208, network interface module 210, and accessory input/output (I/O) interface 214. Processor 204 in this embodiment can be a programmable processor that executes programs to implement operations such as playback of media tracks and browsing a database of stored media assets as well as performing various tasks based on location data generated by the PMD or provided by accessory 220, e.g., as described below.

Storage device 206 can be implemented, e.g., using disk, flash memory, or any other non-volatile storage medium. In some embodiments, storage device 206 can store information useful for location based services, e.g., maps, application programs, or the like, in addition to a database of media assets, such as audio, video, still images, or the like. Other information, including programs to be executed by processor 204, can also be stored in storage device 206.

User interface 208 can include one or more input controls 207 such as a touch pad, touch screen, scroll wheel, click wheel, dial, button, keypad, microphone, or the like, as well as display screen 209. Other components, such as an audio output section and/or audio input section (not explicitly shown) can also be included. In some embodiments, a user can view location-related information, e.g., points of interest selected by processor 204 using the location data, on display screen 209 and can operate input controls 207 to invoke various capabilities of PMD 202. For example, the user can interact with a map displayed on display screen 209. Thus, user interface 208 and processor 204 can provide a GUI capable of supporting numerous operations, including location based services.

Accessory I/O interface 214 can allow PMD 202 to communicate with various accessories. For example, accessory I/O interface 214 can support connections to such accessories as an in-vehicle media or navigation system, compact portable GPS receiver, or the like. In one embodiment, accessory I/O interface 214 includes a 30-pin connector corresponding to the connector used on iPod™ products manufactured and sold by Apple Inc. or one or more other connectors, such as a Universal Serial Bus ("USB") or FireWire connector. Alternatively or additionally, accessory I/O interface 214 can include a wireless interface (e.g., Bluetooth or the like). Accessory I/O interface 214 can allow PMD 202 to communicate with accessory 220 or another accessory.

Accessory 220 can include controller 224, PMD I/O interface 226, and location data receiver 228. Controller 224 can include, e.g., a microprocessor or microcontroller executing program code to perform various operations such as computing a position from received location data, manipulating received location data into user readable information, converting received location data into a format suitable for communicating to PMD 202 and the like. Accessory 220 can have other components (not shown) such as user input controls, visual and/or audio output components, etc.

Location data receiver 228 can include a GPS receiver and can be configured to communicate with GPS satellites in order to obtain information usable to determine a location of the accessory. In alternative embodiments, location data receiver 228 can be configured to receive location-related information from cellular phone towers, wireless access points, or the like. Receiver 228 can communicate the received location-related information to controller 224. Controller 224 can be configured to receive this location-related information and output a signal comprising location data that is usable by PMD 202. In some embodiments, the output location data can be the same as received information. In other embodiments, controller 224 can process the received information, e.g., by computing device coordinates from received satellite signals. Controller 224 can route the location data received by receiver 228 to PMD 202 via PMD I/O interface 226 and accessory I/O interface 214. In one embodiment, PMD I/O interface 226 includes a 30-pin connector that mates with the connector used on iPod™ products manufactured and sold by Apple Inc. PMD I/O interface 226 can also include other types of connectors, e.g., Universal Serial Bus (USB) or FireWire connectors. Alternatively, PMD I/O interface 226 can include a wireless interface (e.g., Bluetooth or the like).

Accessory 220 can be any accessory that incorporates GPS or other location determination capability. Examples include a stand-alone GPS receiver, a circuit-board implementing a GPS receiver, a mobile phone capable of providing information related to nearby cellular towers, and so on.

Figure 2B:
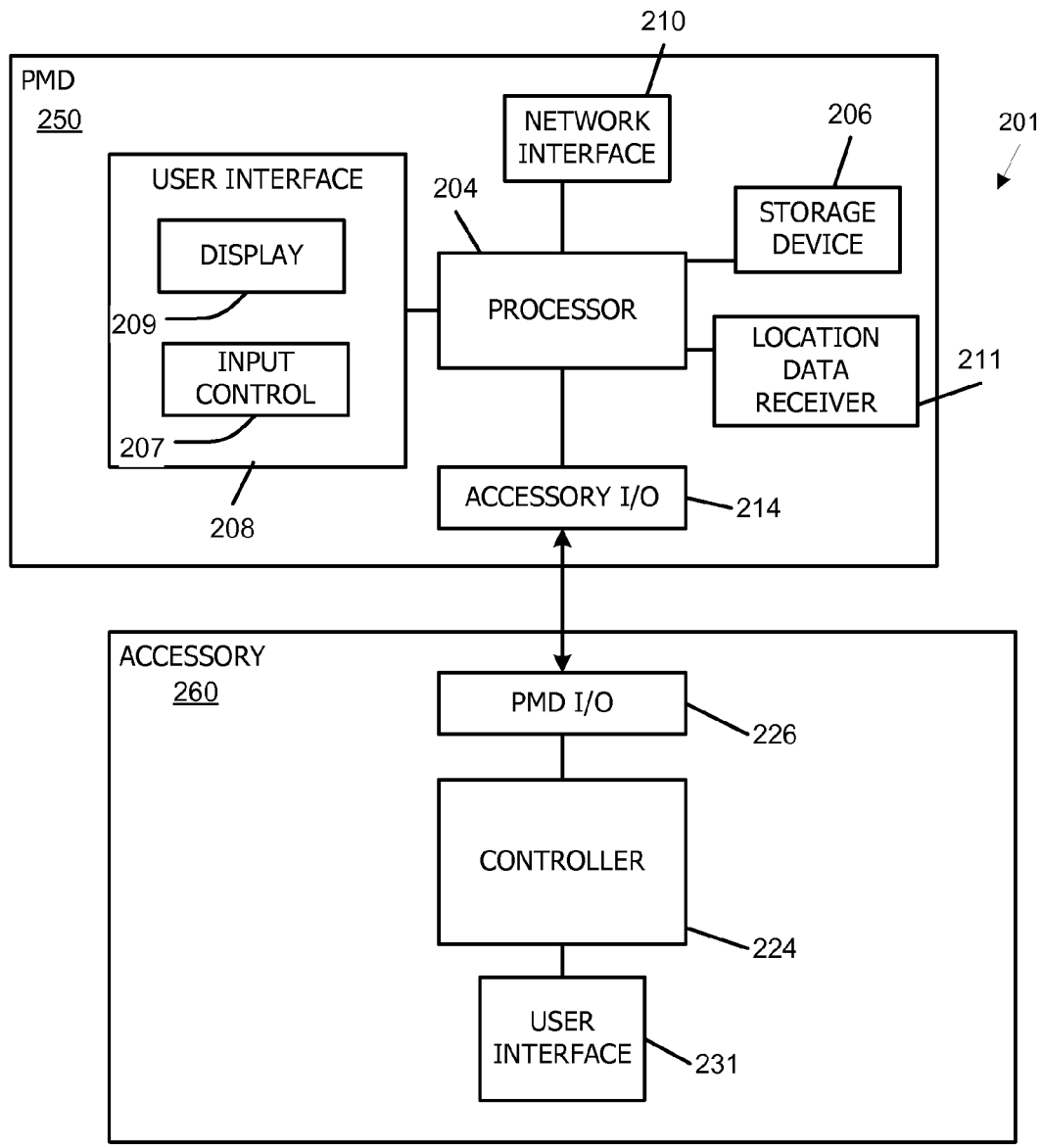
FIG. 2B is a block diagram of a system including a PMD and accessory according to an alternative embodiment of the present invention.

FIG. 2B is a block diagram of a system 201 according to another embodiment of the present invention. In this embodiment, PMD 250 has location determination capability and can send location data to accessory 260. For example, PMD 250 can include a location data receiver 211. Receiver 211 can be, e.g., a GPS receiver. Processor 204 can receive the location data from receiver 211 and communicate the location data to accessory 260 using accessory I/O interface 214. In some embodiments, the output location data can be the same as received information. In other embodiments, processor 204 can process the received location data, e.g., by computing device coordinates from received satellite signals and outputting the result. The remaining components of PMD 250 can be similar to those of PMD 202 described above.

Accessory 260 can be configured to accept location data from PMD I/O interface 226 and use that information to perform additional tasks. Examples of such an accessory can include an in-vehicle video system capable of displaying location related information on a map. Controller 224 can receive location data from PMD 250 via accessory PMD I/O interface 226. Controller 224 can convert the received data into user readable location data, e.g., displaying the current location on a map. User interface 231 can be used to present operational or control information as well as location data to the user. In addition, user interface 231 can also provide the ability to receive input from a user, e.g. via touch screen, scroll wheel, dial, keypad, remote control, etc.

It will be appreciated that the system configurations and components described herein are illustrative and that variations and modifications are possible. For example, PMD 250 and accessory 220 can be connected with each other for exchanging location data, i.e. both devices can have location determination capability. The PMD and/or accessory can also have other capabilities, (e.g., placing and/or receiving calls) not specifically described herein. Further, while the PMD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Referring to FIG. 2A (and understanding that the same applies to FIG. 2B), accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel between accessory I/O interface 214 and PMD I/O interface 226 is open and are "disconnected" whenever the communication channel is closed. Connection can be achieved, e.g., by direct physical attachment (e.g., between respective mating connectors of PMD 202 and accessory 220), by an indirect connection such as a cable, or by establishing a wireless communication channel. Similarly, disconnection can be achieved by physical detachment, disconnecting a cable, powering down accessory 220 or PMD 202, or closing the wireless communication channel. Thus, a variety of communication channels can be used, including wired channels such as USB, FireWire, or universal asynchronous receiver/transmitter ("UART"), or wireless channels such as Bluetooth.

Regardless of the particular communication channel, as long as PMD 202 and accessory 220 are connected to each other, the devices can communicate by exchanging commands and data according to a protocol. The protocol defines a format for sending messages between PMD 202 and accessory 220. For instance, the protocol can specify that each message be sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In some embodiments, the commands can be defined such that a particular command is valid in only one direction. The packet can also include error-detection or error-correction codes, e.g., as known in the art.

The protocol can define a number of "lingoes," where a "lingo" is a group of related commands that can be supported (or unsupported) by various classes of accessories. In one embodiment, a command can be uniquely identified by a first byte identifying the lingo to which the command belongs and a second byte identifying the particular command within the lingo. Other command structures can also be used. It is not required that all accessories, or all PMDs to which an accessory can be connected, support every lingo defined within the protocol.

In some embodiments, every accessory 220 and every PMD 202 that are designed to be interoperable with each other support at least a "general" lingo that includes commands common to all such devices. The general lingo can include commands enabling PMD 202 and accessory 220 to identify themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) can be blocked from invoking certain commands or lingoes if the authentication is unsuccessful.

A command protocol supported by PMD 202 and accessory 220 can include a "location" lingo (or other group of commands) that can be used to communicate commands and data related to the location of either the PMD or the accessory. The location lingo can include commands used by the PMD to obtain location data capabilities and location data from the accessory and can further include commands used by the accessory to obtain location data capabilities and location data from the PMD. In one embodiment, the location lingo is designed to be symmetric in that the PMD and the accessory can each obtain and send similar information to each other using similar commands. Thus, either the PMD or the accessory can act as source of location data for the other. Examples are described below.

Figure 3A:
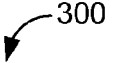
FIG. 3A is a table listing commands that can be used to exchange information between a PMD and an accessory according to an embodiment of the present invention.
Figure 3B:
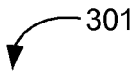
FIG. 3B is a table listing commands that can be used to exchange information between an accessory and a PMD according to an embodiment of the present invention

FIGS. 3A and 3B show tables 300 and 301, respectively, listing commands for exchanging location data according to an embodiment of the present invention. In this embodiment, each command is sent only in one direction, either from PMD 202 to accessory 220 (denoted P→A) or from accessory 220 to PMD 202 (denoted A→P). The commands listed in table 300 can be used when the accessory has location determination capability and commands listed in table 301 can be used when the PMD has location determination capability.

In one embodiment, each instance of a command that is sent or received has a unique transaction identifier associated therewith. The transaction identifier can enable the PMD and the accessory to track each command, a response to that command, and a retry of that command, if applicable. This helps to ensure that requests and replies associated with a particular command can be recognized and accounted for accurately.

Referring to FIG. 3A, the AccACK command can be sent by the accessory to the PMD in response to a command sent by the PMD to the accessory. The payload of the AccACK command can include one or more status bits to indicate whether the command was received successfully. In the event of an error, the status bits can also indicate the type of error, e.g., bad parameter, invalid command, etc. In some embodiments an AccACK command indicating success is sent only if no other responsive command is sent. In other embodiments, an AccACK command is sent only if an error occurs.

The GetAccCaps command can be sent by the PMD to the accessory to request capability information related to location determination. The payload can be a bit mask identifying the type(s) of information requested. The requested capability information types can include information about system capabilities. System capability information can include, e.g., the version of the location lingo supported by the accessory, whether the accessory can send location data only upon request or whether the accessory can provide location data automatically, whether the accessory can send notification of difference of location data between the last reported location data and current location data, an accuracy parameter associated with the location data, etc. The requested information can also include GPS location capability information, such as GPS data format supported by the accessory, e.g., National Marine Electronics Association (NMEA) data format. (NMEA is a standard format for transferring GPS information, e.g. as published in NMEA 0183 Interface standard document, version 3.01). Other formats can also be supported. The requested information can further include location assistance capability information, such as whether the accessory supports GPS or non-GPS location determination methods, e.g. cellular tower triangulation, wireless access point determination, or GPS satellite ephemeris data.

The accessory can send a RetAccCaps command in response to the GetAccCaps command. The payload of the RetAccCaps command can include the capability information requested by the PMD. If the accessory does not support a particular capability about which information was requested by the PMD, it can return an AccACK command to indicate its inability to send information about the requested capability. In addition, if GetAccCaps command requests multiple information types, each type of information requested can be provided in a separate RetAccCaps command.

The GetAccControl command can be sent by the PMD to the accessory to acquire information about the control state of the accessory. The control state information of the accessory can include information about various parameters of the accessory, and the payload of the GetAccControl command can include a bitmask indicating the type(s) of control state information requested. In one embodiment, types of control state information can include current power state, (e.g., off, on, or standby), whether asynchronous data transfer is enabled or disabled, whether notification of changes in location data is enabled or disabled, whether NMEA sentence filtering is enabled or disabled, and whether the location assistance capability is enabled or disabled. The accessory can send one or more RetAccControl commands in response to the GetAccControl command to provide the requested control state information to the PMD.

The PMD can send a SetAccControl command to the accessory, e.g., after receipt of the control information via the RetAccControl command. The PMD can set the control state of the accessory to a desired configuration, based on the current control state of the accessory and the capabilities supported by the accessory. The PMD can set one or more of the control state parameters (e.g. those described above) of the accessory to a desired setting using on or more SetAccControl commands. The payload of each SetAccControl command identifies a control state parameter to be set and the desired setting. In some embodiments, multiple control state parameters can be set using one SetAccControl command. If the PMD attempts to set any parameter to an invalid value, the accessory can return the AccACK command notifying the PMD of the error.

The PMD can send the GetAccData command to the accessory to request location data. Types of location-related data that can be requested using this command include NMEA GPS data, current point location data, GPS satellite ephemeris data, latitude and longitude data, location accuracy radius, non-GPS data types (e.g., identification of nearby cellular phone towers or wireless access points), time and date information, etc. The accessory can respond to the GetAccData command by sending a RetAccData command to the PMD. The payload of the RetAccData command can include location data of the type requested by the PMD and/or other location-related data as described above. In addition, the PMD can send the SetAccData command to set location data on the accessory.

The AsyncAccData command can be sent by the accessory to the PMD to notify the PMD that new location data is available. Prior to the accessory sending this command, the asynchronous data mode on the accessory can be enabled by the PMD using the SetAccControl command. Once enabled, the accessory can use the AsyncAccData command to notify the PMD that new location data is available. The PMD can then request the new location data using the GetAccData command, or the accessory can automatically send the new location data using the RetAccData command without waiting for the GetAccData command. In some embodiments, the accessory can be configured to automatically transfer location data to the PMD under particular conditions, e.g., using the SetAccControl command with appropriate parameters in the payload. These conditions can be, e.g., a fixed time interval, e.g., 10 minutes, or based on occurrence of a specific event, e.g., relocation of the accessory by more than 100 feet from its previous location.

The commands illustrated in table 301 (FIG. 3B) can be used when the PMD has location determination capability. The commands shown in FIG. 3B operate in a similar fashion to those discussed above in connection with FIG. 3A, with the roles of the PMD and accessory reversed.

Figure 4:
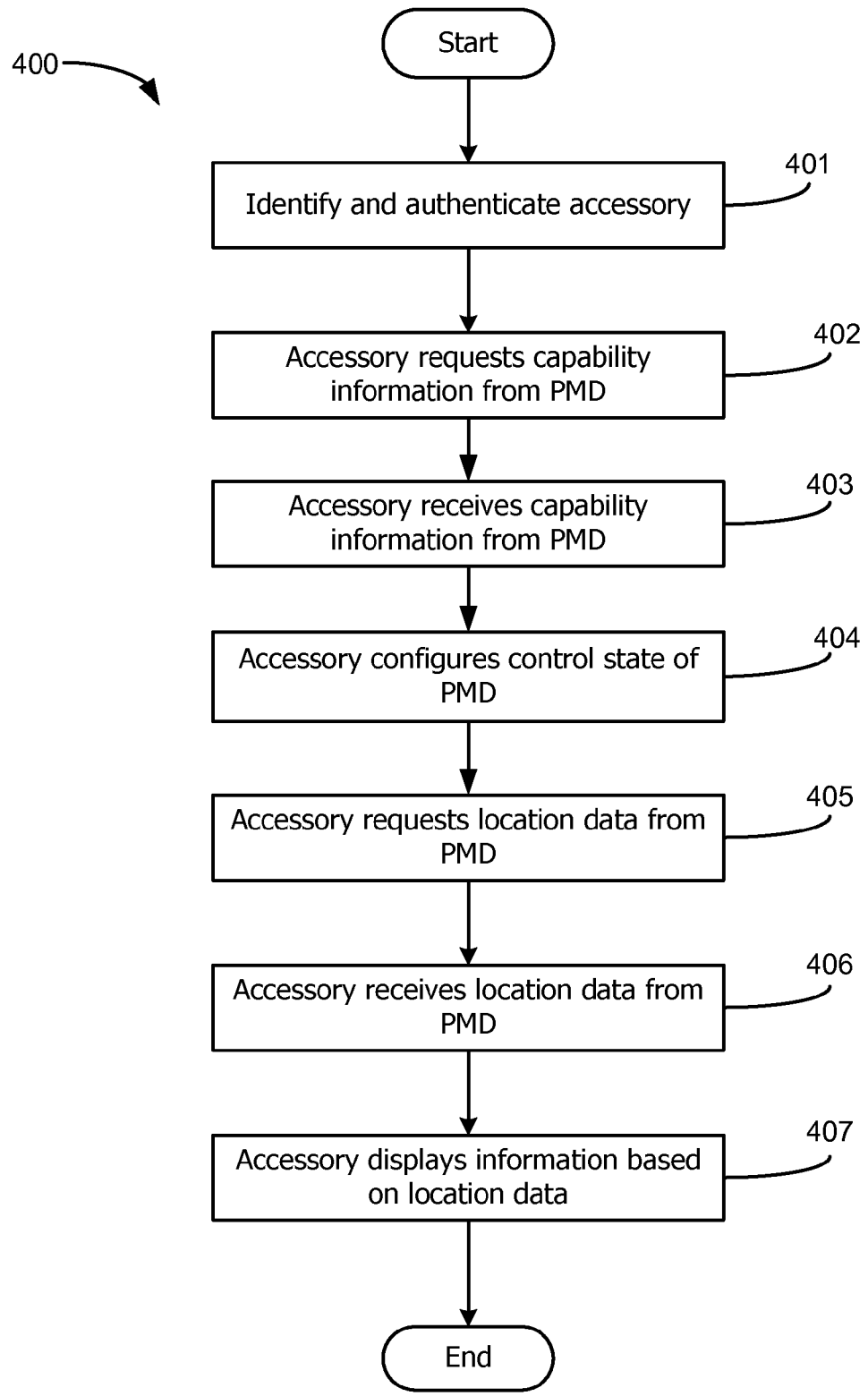
FIG. 4 is a flow diagram of a process that can be used by a portable media device to send location data to an accessory according to an embodiment of the present invention.

FIG. 4 is a flow diagram of a process 400 for exchanging location data between a PMD (e.g., PMD 202 of FIG. 2A) and an accessory (e.g., accessory 220 of FIG. 2A) according to one embodiment of the present invention. In this embodiment, the PMD is configured with location determination capability, e.g., GPS capability. The PMD can communicate and relay the location data to the accessory, e.g., using set of commands listed in table 301 of FIG. 3B.

At block 401, the PMD can send commands to the accessory to identify and authenticate the accessory. These commands can be part of the general lingo described above, and the details of accessory identification and authentication are not critical to understanding the present embodiment.

At block 402, the accessory can request information about capabilities of the PMD. For example, the GetPMDCaps command, of FIG. 3B, can be sent by the accessory to the PMD to request capability information from the PMD. At block 403, the accessory receives the requested information, e.g., the PMD can respond with the RetPMDCaps command.

At block 404, the accessory configures the control state of the PMD. For example, the accessory can request information related to the PMD control state using the GetPMDControl command, and the PMD can respond using the RetPMDControl command. Once the accessory receives this information, it can set the control state of the PMD to a desired configuration, e.g., using the SetPMDControl command, taking into account the PMD capabilities and the current control state of the PMD.

At block 405, the accessory can request location data from the PMD, e.g., using the GetPMDData command. At block 406, the accessory receives the location data. For instance, the PMD can respond with the RetPMDData command, which includes the location data of the requested type.

In an alternative embodiment, the PMD can send an AsyncPMDData command to the accessory in order to notify the accessory that new location data, which may be different from the last location data sent, is available. In some embodiments, the AsyncPMDData command can be used if the PMD has been configured to support asynchronous notification. For example, at block 404, the accessory can use the SetPMDControl command to set a parameter that causes the PMD to provide asynchronous notification under desired conditions. At block 405, the accessory can request the new location data using the GetPMDData command once it is notified that new location data is available. Alternatively, in the asynchronous mode, PMD can simply send new location data automatically, e.g., at predetermined time intervals or whenever some other condition is met.

After receiving the location data from the PMD, the accessory can display information based on the location data, as illustrated in block 407. In one embodiment, the accessory can use the received location data to display a current location, e.g., by indicating the location on a displayed map. The accessory can be further programmed to locate and display information about points of interest based on the current location data. Points of interest can include, e.g., gas stations, banks, restaurants, schools, historic or cultural sites, and other services within a certain distance of the current location, or any other locations that can be of interest to a user.

Figure 5:
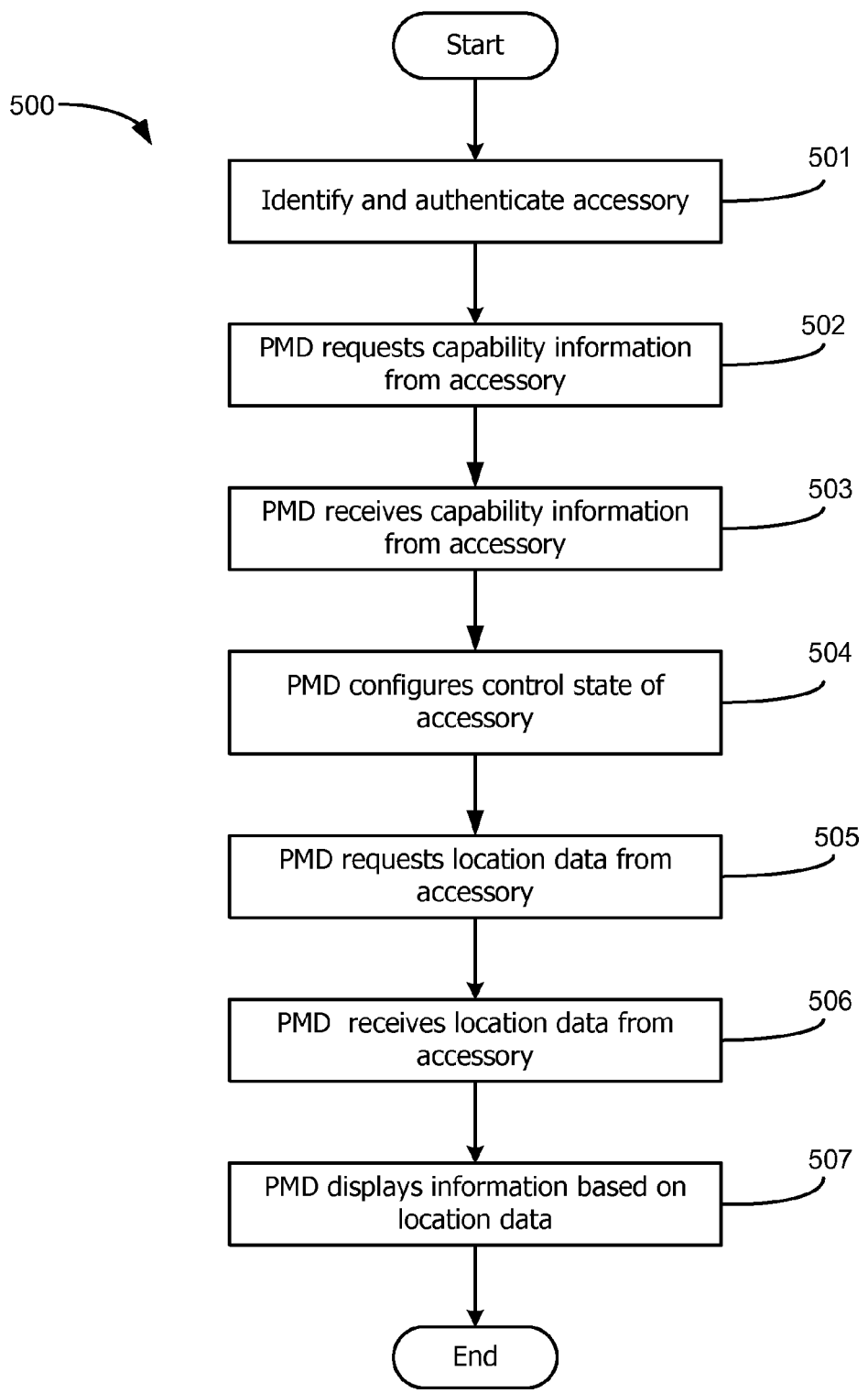
FIG. 5 is a flow diagram of a process that can be used by an accessory to send location data to a portable media device according to an embodiment of the present invention.

FIG. 5 is a flow diagram of a process 500 for exchanging location data between the accessory and a PMD according to another embodiment of the present invention. In this embodiment, the accessory is equipped with location determination capabilities and communicates location data to the PMD (e.g. FIG. 2A). As described above, the PMD can communicate with the accessory via a set of commands.

At block 501, the PMD can identify and authenticate the accessory by exchanging a series of general lingo commands as described above with reference to FIG. 4. Once the PMD has established communication with the accessory and verified the accessory's identity, the PMD is now ready to exchange other data with the accessory.

Prior to requesting or receiving any location data from the accessory, the PMD can request information about capabilities of the accessory at block 502. For example, the GetAccCaps command of FIG. 3A, can be sent by the PMD to the accessory to request capability information from the accessory. At block 503, PMD receives the requested information, for example, the accessory can respond with the RetAccCaps command. In another embodiment, the accessory may provide capability information without waiting for a request from the PMD.

At block 504, the PMD configures the control state of the accessory. For example, the PMD can request information related to accessory control state using the GetAccControl command, and the accessory can respond using the RetAccControl command. Once the PMD receives this information, it can set the control state of the accessory to a desired configuration, e.g., using the SetAccControl command, taking into account the accessory capabilities and the current control state of the accessory.

At block 505, the PMD can request location data from the accessory, e.g., using the GetAccData command. At block 506, the PMD receives the location data. For instance, the accessory can respond with the RetAccData command, which includes the location data of the requested type.

In an alternative embodiment, the accessory can send an AsyncAccData command to the PMD in order to notify the PMD that new location data, which can be different from the last location data sent, is available. In some embodiments, the AsyncAccData command can be used if the accessory has been configured to support asynchronous notification. For example, at block 504, the PMD can use the SetAccControl command to set a parameter that causes the accessory to provide asynchronous notification under desired conditions. The PMD can request the new location data using the GetAccData command once it is notified that new location data is available. Alternatively, in the asynchronous mode, accessory can simply send new location data automatically, e.g., at predetermined time intervals or whenever some other condition is met.

After receiving the location data from the accessory, the PMD can display information based on the location data, as illustrated in block 507. In one embodiment, the PMD can use the received location data to display a current location, e.g., by indicating the location on a displayed map. The PMD can be further programmed to locate and display information about points of interest based on the current location data, like the accessory described in process 400 above.

It will be appreciated that the processes 400 and 500 are illustrative and that variations and modifications are possible. Acts described as sequential may be executed in parallel, order of acts may be varied, and acts may be modified, combined, added, or omitted. For instance, block 504 can include several sub-acts wherein the PMD can send multiple SetAccControl commands to configure the control state of the accessory. Alternatively, block 504 can be omitted if the PMD determines that the control state of the accessory need not be changed.

Figure 6:
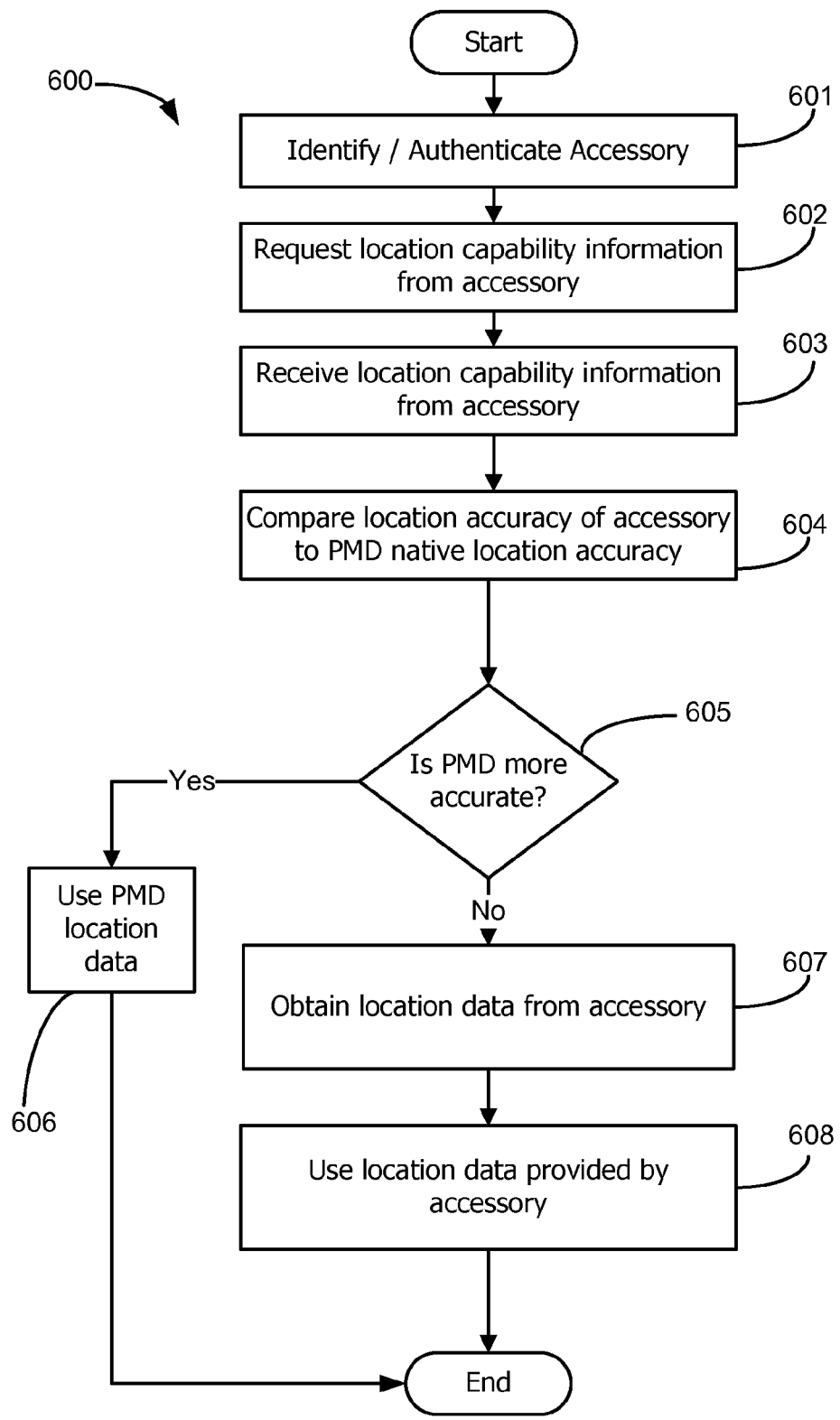
FIG. 6 is a flow diagram of a process that can be used by a portable media device to compare the location data received from an accessory with its own location data according to an embodiment of the present invention.

FIG. 6 is a flow diagram of a process 600 for exchanging location data between the PMD and an accessory according to yet another embodiment of the present invention. In this embodiment, both the PMD and the accessory are equipped with location determination capability. At block 601, the PMD can identify and authenticate the accessory e.g., as in process 400 described above. Once the authentication is successful, the PMD can request location capability information from the accessory at block 602. For instance, the PMD can use the GetAccCaps command, as described above, to request this information. The location capability information can include information related to the accuracy of the location data that can be provided by the accessory. For example, in a GPS location detection method, the accuracy of the location data is affected by many factors including but not limited to atmospheric effects, multipath effects, satellite geometry, and clock and rounding errors. As a result, the accuracy of location data determined by devices incorporating GPS receivers can vary by a considerable amount. In a GPS-based system, accuracy is usually defined as the distance to within which the equipment incorporating the GPS receiver can pinpoint a location. For example, a conventional consumer vehicle navigation system has location detection accuracy in the range of 10-15 meters while some commercial/military grade GPS receivers can have an accuracy of about 1 meter. Similarly, other location determination methods can also be affected by many factors that result in varying degrees of accuracy.

At block 603, the PMD receives the location capability information, including location accuracy information, from the accessory. For example, the accessory can send the RetAccCaps command. Upon receiving the location accuracy information from the accessory, the PMD compares the location accuracy information received from the accessory to its own location accuracy information at block 604. In another embodiment, the PMD can request location data, e.g., for the current location, from the accessory. Location data for the current location can include an accuracy information related to it, e.g., location is accurate to within 60 yards. The PMD can then compare the accuracy of location data, for the current location, received from the accessory to the accuracy of its own location data for the current location.

If, at block 605, the PMD determines that its own location accuracy is better than that of the accessory, the PMD uses its own location data to perform further tasks like displaying location information based on the location data (block 606).

Alternatively, if at block 605 the PMD determines that the location accuracy information of the accessory is more accurate than its own location accuracy information, the PMD can request location data from the accessory at block 607. The PMD can use the GetAccData command to request location data from the accessory. The accessory can respond with the RetAccData command and provide location data to the PMD. Alternatively, the accessory can send location data to the PMD using asynchronous notification using the AsyncAccData command. Once the PMD receives location data from the accessory, the PMD can use the location data to perform further tasks, e.g., displaying location information based on the location data (block 608). Blocks 602-608 can be repeated every time location data is updated or when the location accuracy information changes.

Figure 7:
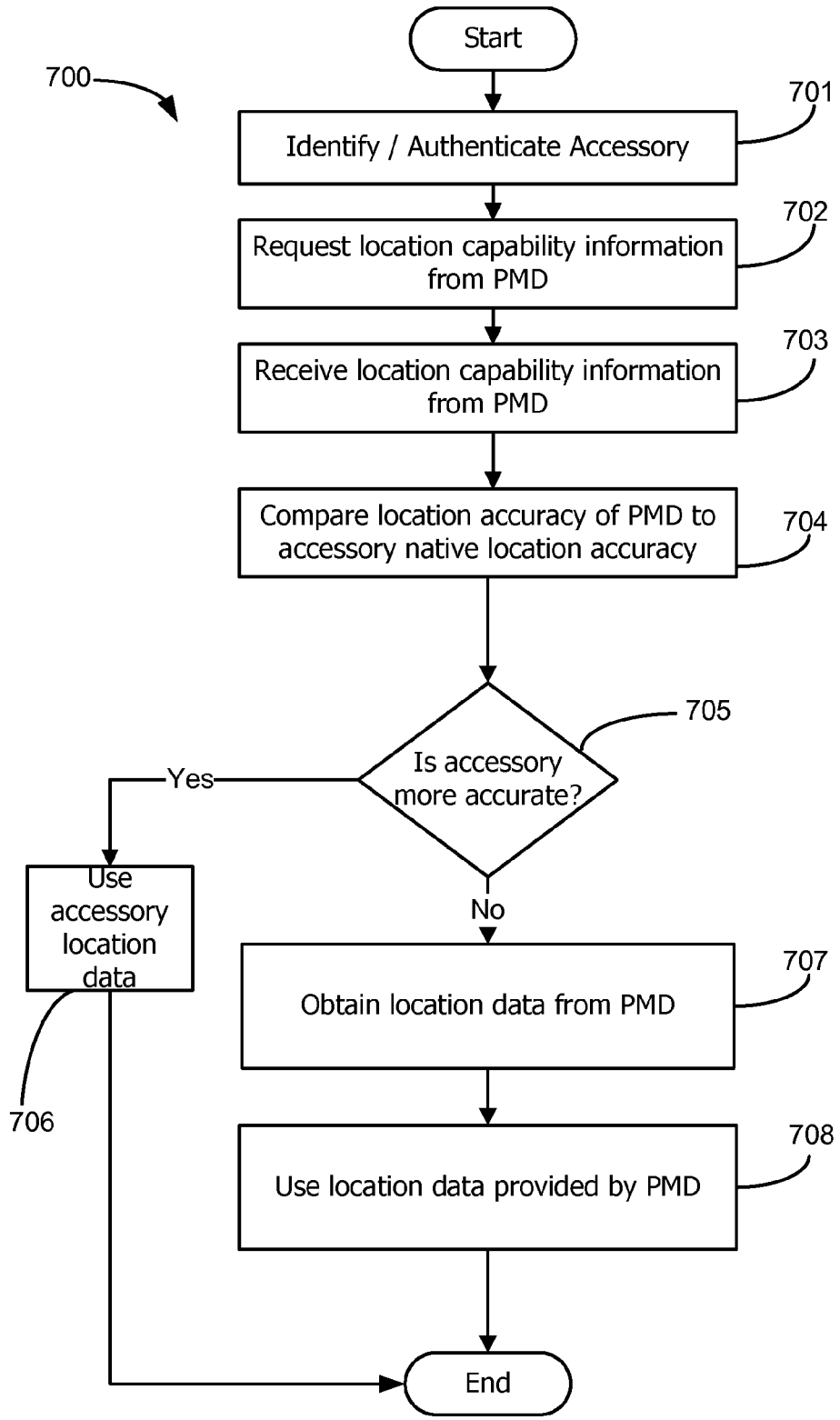
FIG. 7 is a flow diagram of a process that can be used by an accessory to compare the location data received from a portable media device with its own location data according to an embodiment of the present invention.

FIG. 7 is a flow diagram of a process 700 for exchanging location data between an accessory and a PMD according to yet another embodiment of the present invention. In this embodiment, the accessory can perform the comparison of the location accuracy information and can request location data from PMD. At block 701, the accessory can identify and authenticate itself to the PMD, e.g., as in process 400 described above. Once the authentication is successful, the accessory can request location capability information from the PMD at block 702. The location capability information can be similar to capability information described above, e.g., with reference to process 600 (FIG. 6), At block 703, the accessory receives the location capability information, including location accuracy information, from the PMD. Upon receiving the location accuracy information from the PMD, the accessory compares the location accuracy information received from the PMD to its own location accuracy information at block 704. In another embodiment, the accessory can request and receive location data that includes associated accuracy information from the PMD. The accessory can then compare the accuracy of the current location data received from the PMD to the accuracy of its own location data.

If, at block 705, the accessory determines that its own location accuracy is better than that of the PMD, the accessory uses its own location data to perform further tasks like displaying location information based on the location data (block 706).

Alternatively, if at block 705 the accessory determines that the location accuracy information of the PMD is more accurate than its own location accuracy information, the accessory can request location data from the PMD at block 707. Once the accessory receives location data from the PMD, the accessory can use the location data to perform further tasks, e.g., displaying location information based on the location data (block 708). Blocks 702-708 can be repeated every time location data is updated or when the location accuracy information changes.

It will be appreciated that processes 600 and 700 described herein are illustrative and that variations and modifications are possible. Acts described as sequential can be executed in parallel, order of acts can be varied, and acts can be modified or combined. For instance, blocks 601 and 602 can include multiple sub-acts to identify and authenticate the accessory and to request location capability information, respectively.

While the invention has been described with respect to specific embodiments, those skilled in the art will recognize that numerous modifications are possible. For instance, the location determination capability is not limited to GPS. Other location determination techniques such as, cellular phone tower triangulation, determining location based on information about wireless access points in the vicinity, etc. can also be used. Moreover, the present invention is not limited to location determination. Embodiments of the present invention can be used in various other applications involving various position or motion sensors, such as altimeters, accelerometers, gyroscopes, compasses, dead reckoning, or the like.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. An accessory for use with a portable media device, the accessory comprising:
   a controller; and
   an interface coupled to the controller and configured to communicate with the portable media device using a set of commands, the set of commands including:
      a first command receivable by the accessory, the first command requesting location data from the accessory;
      a second command sendable by the accessory, the second command including the location data from the accessory;
      a third command receivable by the accessory, the third command requesting location capability information from the accessory; and
      a fourth command sendable by the accessory, the fourth command including the location capability information from the accessory.

2. The accessory of claim 1 wherein the set of commands further includes:
   a fifth command sendable by the accessory, the fifth command requesting location data from the portable media device; and
   a sixth command receivable by the accessory, the sixth command including the location data from the portable media player.

3. The accessory of claim 1 wherein the set of commands further includes:
   a fifth command receivable by the accessory, the fifth command instructing the accessory to send the second command without waiting to receive the first command.

4. The accessory of claim 1 wherein the set of commands further includes:
   a fifth command receivable by the accessory, the fifth command instructing the accessory to send the second command in response to occurrence of an event.

5. The accessory of claim 1 wherein the second command further includes an accuracy parameter associated with the location data.

6. The accessory of claim 1 wherein the interface includes a serial communication interface operable to communicate the set of commands.

7. The accessory of claim 1 wherein the interface includes a wireless communication interface operable to communicate the set of commands.

8. A method for use in an accessory communicably coupled to a portable media device, the method comprising:
   receiving a capability command from the portable media device, the capability command including information specifying a type of location data supported by the portable media device;
   sending a data request command to the portable media device, the data request command requesting location data of the specified type; and
   receiving a data response command from the portable media device, the data response command including the location data of the specified type.

9. The method of claim 8 wherein the capability command further includes one or more information items from a group consisting of an information item identifying a global positioning system (GPS) data format used by the portable media device, an information item indicating availability of auxiliary positioning information from the portable media device, an information item indicating whether the portable media device is operable in an asynchronous mode, and an accuracy parameter for the location data.

10. A computer-readable medium containing program instructions that, when executed by a controller within an accessory, cause the controller to execute a method of communicating location data to a portable media device, the method comprising
    determining, based on an internal position detection unit, first location data and a first accuracy parameter associated with the first location data;
    receiving, from the portable media device, second location data and a second accuracy parameter associated with the second location data;
    comparing the second accuracy parameter to the first accuracy parameter;
    selecting either the first location data or the second location data, the selection based at least in part on the first accuracy parameter and the second accuracy parameter; and
    using the selected location data to determine the location of the accessory.

11. The computer-readable medium of claim 10 wherein the method further comprises:
    displaying the location of the accessory, the location being overlaid on a map.

12. The computer-readable medium of claim 11 wherein the method further comprises:
    displaying information about points of interest on the map, the information about points of interest being based at least in part on the location of the accessory.

13. The computer-readable medium of claim 10 wherein the method further comprises:
    instructing the portable media device to send the second location data at periodic intervals.

14. A portable media device for use with an accessory, the portable media device comprising:
    a user interface;
    a position determination unit configured to generate location data;
    an accessory interface; and
    a processor coupled to the user interface, the accessory interface, and the position determination unit, the processor being configured to communicate with the accessory via the accessory interface using a set of commands, the set of commands comprising:
       a first command receivable by the portable media device, the first command requesting current location data from the portable media device;
       a second command sendable by the portable media device, the second command including the current location data from the portable media device;
       a third command sendable by the portable media device, the third command requesting current location data from the accessory; and
       a fourth command receivable by the portable media device, the fourth command including the current location data from the accessory.

15. The portable media device of claim 14 wherein the set of commands further comprises:
    a fifth command sendable by the portable media device, the fifth command requesting location capabilities information from the accessory.

16. The portable media device of claim 15 wherein the location capabilities information comprises information indicating which of a plurality of location determination techniques the accessory supports, wherein the plurality of location determination techniques includes a Global Positioning System (GPS) technique and at least one other technique.

17. The portable media device of claim 16 wherein the at least one other technique includes a location determination technique using wireless access point detection.

18. The portable media device of claim 15 wherein the location capability information includes accuracy information associated with the second location data.

19. The portable media device of claim 14 wherein the set of commands further comprises:
a fifth command receivable by the portable media device, the fifth command requesting location capabilities information from the portable media device.

20. The portable media device of claim 14 wherein the position determination unit is further configured to provide auxiliary positioning information, the auxiliary positioning information including an information item selected from a group consisting of accelerometer data, compass data, gyroscope data, altimeter data, and dead reckoning data.

21. A method for use in a portable media device, the method comprising:
receiving a capability command from the accessory, the capability command including information identifying one or more types of location data as being supported by the accessory;
sending a data request command to the accessory, the data request command requesting location data of a selected one of the supported types; and
receiving a data response command from the accessory, the data response command including the location data of the selected type.

22. The method of claim 21 wherein the location data is received by the portable media device automatically based upon occurrence of a condition.

23. The method of claim 22 wherein the condition corresponds to a predetermined time interval.

24. The method of claim 21 further comprising:
receiving a capability-requesting command from the accessory, the capability-requesting command requesting capability information from the portable media device; and
sending a capability-response command to the accessory, the capability-response command including the requested capability information.

25. The method of claim 24 wherein the capability information includes one or more items from a group of information items consisting of an information item identifying a global positioning system (GPS) data format used by the portable media device, an information item indicating availability of auxiliary positioning information from the portable media device, an information item indicating whether the portable media device is operable in an asynchronous mode, and an accuracy parameter for the location data.

26. A computer-readable medium containing program instructions that, when executed by a processor within a portable media device, cause the processor to execute a method of communicating location data to an accessory, the method comprising:
receiving a first command from the accessory, the first command requesting information about a location data format supported by the portable media device;
sending a second command to the accessory, the second command including information about the location data format supported by the portable media device;
receiving a third command from the accessory, the third command requesting location data of a specified type, corresponding to the location data format supported by the portable media device; and
sending a fourth command to the accessory, the fourth command including the location data of the specified type.

27. The computer-readable medium of claim 26 wherein the method further comprises:
receiving a fifth command from the accessory, the fifth command instructing the portable media device to send the fourth command without waiting for the third command.

28. The computer-readable medium of claim 26 wherein the method further comprises:
receiving a fifth command from the accessory, the fifth command instructing the portable media device to send the fourth command periodically.

* * * * *